(12) United States Patent
Walter et al.

(10) Patent No.: US 7,375,476 B2
(45) Date of Patent: May 20, 2008

(54) LIGHTING DEVICE HAVING A CIRCUIT INCLUDING A PLURALITY OF LIGHT EMITTING DIODES, AND METHODS OF CONTROLLING AND CALIBRATING LIGHTING DEVICES

(75) Inventors: Scott D. Walter, Village of Twin Lakes, WI (US); Robert E. Corbett, Gilroy, CA (US); Richard G. Matsui, Sunnyvale, CA (US); Ben A. Beer, Bluffton, IN (US)

(73) Assignee: S.C. Johnson & Son, Inc., Racine, WI (US)

( * ) Notice: Subject to any disclaimer, the term of this patent is extended or adjusted under 35 U.S.C. 154(b) by 109 days.

(21) Appl. No.: 11/101,461

(22) Filed: Apr. 8, 2005

(65) Prior Publication Data

US 2006/0226795 A1    Oct. 12, 2006

(51) Int. Cl.
    *H05B 37/00*    (2006.01)
(52) U.S. Cl. .............. 315/312; 315/128; 315/122; 315/312; 315/209 R; 315/291; 315/247
(58) Field of Classification Search ........... 315/312, 315/313, 320, 324, 325, 291, 129, 247, 216, 315/194; 345/204
See application file for complete search history.

(56) References Cited

U.S. PATENT DOCUMENTS

| | | | |
|---|---|---|---|
| 5,463,280 A | 10/1995 | Johnson | 315/187 |
| 5,598,068 A | 1/1997 | Shirai | 315/185 R |
| 5,634,711 A * | 6/1997 | Kennedy et al. | 362/119 |
| 5,726,535 A | 3/1998 | Yan | 315/185 R |
| 6,137,239 A | 10/2000 | Wu et al. | |
| 6,150,771 A * | 11/2000 | Perry | 315/291 |
| 6,153,980 A * | 11/2000 | Marshall et al. | 315/200 A |
| 6,239,716 B1 * | 5/2001 | Pross et al. | 340/815.4 |
| 6,471,716 B1 * | 10/2002 | Pecukonis | 607/89 |
| 6,498,440 B2 * | 12/2002 | Stam et al. | 315/291 |
| 6,636,003 B2 | 10/2003 | Rahm et al. | 315/179 |
| 6,659,622 B2 * | 12/2003 | Katogi et al. | 362/219 |
| 6,844,824 B2 | 1/2005 | Vukosic | 340/815.65 |

(Continued)

FOREIGN PATENT DOCUMENTS

| | | |
|---|---|---|
| EP | 0129498 A1 | 12/1984 |
| EP | 1499165 A2 | 1/2005 |
| GB | 2 239 306 A | 6/1991 |
| WO | WO 2005/003625 | 1/2005 |

*Primary Examiner*—Douglas W. Owens
*Assistant Examiner*—Chuc Tran (57) ABSTRACT

A lighting device (132) includes a circuit having a power supply and a plurality of light emitting diodes (120) connected in series with the power supply. The plurality of light emitting diodes (120) includes at least two groups of series-connected light emitting diodes, the groups of series-connected light emitting diodes being connected in series. A different optically isolated field effect transistor (U3-U5) is connected in parallel with each group of series-connected light emitting diodes, for selectively shunting around the group of series-connected light emitting diodes. A different capacitor (C8-C10) can also be connected in parallel with each group of series-connected light emitting diodes. A controller (U2) is connected to a gate of each of the optically isolated field effect transistors (U3-U5) for selectively turning the optically isolated field effect transistors (U3-U5) on and off. Thus, the controller U2 is electrically isolated from the power supply by the optically isolated field effect transistors (U3-U5). The light emitting diodes (120) can be driven and controlled using pulse width modulation methods.

25 Claims, 6 Drawing Sheets

U.S. PATENT DOCUMENTS

| | | |
|---|---|---|
| 6,853,150 B2 * | 2/2005 | Clauberg et al. ........ 315/185 R |
| 6,858,994 B2 | 2/2005 | Vollrath ................... 315/200 A |
| 6,864,641 B2 * | 3/2005 | Dygert ....................... 315/216 |
| 6,867,557 B2 * | 3/2005 | Ito et al. .................... 315/307 |
| 7,015,654 B1 * | 3/2006 | Kuhlmann et al. ......... 315/291 |
| 7,019,991 B2 * | 3/2006 | Yamashita .................... 363/52 |
| 7,129,652 B2 * | 10/2006 | Patel et al. ................. 315/291 |
| 7,129,679 B2 * | 10/2006 | Inaba et al. ................. 323/222 |
| 7,239,087 B2 * | 7/2007 | Ball ........................... 315/128 |
| 7,246,919 B2 * | 7/2007 | Porchia et al. .............. 362/276 |
| 2002/0047624 A1 | 4/2002 | Stam et al. |
| 2002/0101198 A1 | 8/2002 | Kemp |
| 2002/0145392 A1 | 10/2002 | Hair, III et al. ......... 315/185 R |
| 2002/0175826 A1 * | 11/2002 | Hutchison et al. ..... 340/815.45 |
| 2003/0117088 A1 * | 6/2003 | Tanabe et al. ............... 315/291 |
| 2004/0080941 A1 | 4/2004 | Jiang et al. .................. 362/252 |
| 2004/0135522 A1 | 7/2004 | Berman et al. ............. 315/291 |
| 2004/0189262 A1 * | 9/2004 | McGrath .................... 323/201 |
| 2004/0201988 A1 * | 10/2004 | Allen ......................... 362/249 |
| 2005/0030203 A1 * | 2/2005 | Sharp et al. ................ 340/907 |
| 2006/0038803 A1 * | 2/2006 | Miller et al. ................ 345/204 |
| 2006/0273985 A1 * | 12/2006 | Sun et al. ..................... 345/46 |

* cited by examiner

LIGHTING DEVICE HAVING A CIRCUIT INCLUDING A PLURALITY OF LIGHT EMITTING DIODES, AND METHODS OF CONTROLLING AND CALIBRATING LIGHTING DEVICES

BACKGROUND OF THE INVENTION

1. Field of the Invention

Our invention relates generally to lighting devices having a circuit including a plurality of light emitting diodes (LEDs), and to methods of controlling and calibrating lighting devices.

2. Description of the Related Art

Lighting devices such as electric lamps, and light bulbs used therein, are well known and have been widely used for years. These lamps and bulbs are generally of the incandescent-, halogen-, and fluorescent-types. More recently, lighting devices using LEDs have entered the market. LED lighting devices have the advantages of low power requirements, high efficiency and long life. While LEDs themselves are quite efficient, the circuits that have been used to drive LED lighting devices have tended to be inefficient. For example, because readily available voltage sources tend to have much higher voltages (e.g., 12 or 24 volts DC for vehicular applications, and 120 or 240 volts for standard mains voltage from a wall socket) than the voltage required to drive an LED (2-4 volts, depending on the color), resistors and other semiconductor components have conventionally been used to regulate the voltage. In the process of regulating the voltage supplied to the LEDs, these resistors and semiconductor components convert large amounts of energy into heat, which is inefficient and potentially damaging to the LEDs and other circuit components.

Various attempts to minimize these inefficiencies have been made. For example, lighting devices are known in which a plurality of LEDs are arranged in series, so that the LEDs can be driven by a higher voltage source of power. U.S. Pat. No. 6,239,716 B1 describes, with reference to FIG. 2, a circuit having a plurality of series-connected LEDs usable in an automotive application. Each LED can be short-circuited over a switch, so that in the event of a failure of one LED, the other LEDs may continue to operate by short-circuiting the corresponding LED by means of logic circuit, or dimming of the LEDs can be performed by short-cutting the LEDs by means of circular variation. Another control circuit, which is connected to logic circuit, is connected in series with the LEDs. The logic circuit is also connected to the input of the control circuit. A constant current through the LEDs is set as current adjust by means of the logic circuit via the control circuit, regardless of how many LEDs are in operation. The voltage across all the LEDs must be adjusted upward to 60 volts, for example, in comparison with a lower on-board voltage of 12 volts or 20 volts, due to the series connection of the LEDs.

The configuration of the '716 patent requires a separate switch in parallel with each LED. Thus, if a large number of LEDs is used, a large number of switches is also required, consequently increasing the cost of the circuit. Also, as shown in FIG. 2 of the '716 patent, the control logic and control circuit are run off of approximately the same voltage as the series LED string, i.e., 60 volts, in order to close the switches. The control circuit and LEDs also share the same reference or ground. Control circuits capable of handling such relatively high voltage tend to be larger, more expensive, and to generate more heat than lower voltage (e.g., 3.3-16 volt) controllers and processors.

Accordingly, there remains a need in the art for a lighting device, which is efficient and cost effective to manufacture and operate.

SUMMARY OF THE INVENTION

Generally, our invention relates to lighting devices which provide light for illumination and/or ambient light, the lighting devices having a circuit including a plurality of light emitting diodes, and to methods of controlling and calibrating lighting devices.

As used herein, the terms "calibrate" and "calibrating" simply mean setting or adjusting a feature or characteristic based on one or more desired criteria.

As used herein, the "current rating" of a component means the average (i.e., continuous) current rating, peak current rating, or other predetermined current rating of the component.

As used herein, the term "compare" and its inflected forms mean comparisons made by a human, comparisons made by a computer or other processor, and comparisons made by a human in combination with a computer or other processor. By way of example, comparisons can be made based on visual observations or perceptions, survey data, spectral analysis data, product design specifications, and the like.

In one aspect, our invention relates to a lighting device comprising a circuit. The circuit comprises a power supply that provides a supply voltage and a plurality of light emitting diodes connected in series with the power supply and powered by the supply voltage. The plurality of light emitting diodes includes at least two groups of series-connected light emitting diodes, the groups of series-connected light emitting diodes being connected in series. A plurality of optically isolated field effect transistors is provided, with a different optically isolated field effect transistor being connected in parallel with each group of series-connected light emitting diodes, for selectively shunting around the group of series-connected light emitting diodes to which the optically isolated field effect transistor is connected in parallel. A controller is connected to a gate of each of the optically isolated field effect transistors for selectively turning the optically isolated field effect transistors on and off. In this manner, the controller is electrically isolated from the supply voltage by the optically isolated field effect transistors.

Preferably, the circuit further comprises a plurality of capacitors, with a different capacitor being connected in parallel with each optically isolated field effect transistor and the group of series-connected light emitting diodes associated therewith. The plurality of capacitors is in series with the power supply, such that the capacitances of the plurality of capacitors are cumulative and serve to smooth a wave form of the supply current supplied by the power supply, while each capacitor is at substantially the same potential as the plurality of light emitting diodes.

Preferably, the circuit further comprises a removable memory medium in communication with the controller. The memory medium stores data of at least one program. The controller controls the plurality of optically isolated field effect transistors to control the light emitting diodes in accordance with the data stored on the memory medium.

In another aspect, our invention relates to a lighting device comprising a circuit. The circuit comprises a power supply that provides a supply voltage, and a plurality of light emitting diodes connected in series with the power supply and powered by the supply voltage. The plurality of light emitting diodes includes at least two groups of series-connected light emitting diodes, the groups of series-connected light emitting diodes being connected in series. A plurality of capacitors is provided, with a different capacitor being connected in parallel with each group of series-connected light emitting diodes. The plurality of capacitors is connected in series with the power supply, such that the capacitances of the plurality of capacitors are cumulative and serve to smooth a wave form of the supply current supplied by the power supply, while each capacitor is at substantially the same potential as the plurality of light emitting diodes.

In another aspect, our invention relates to a method of controlling a lighting device. The method comprises the steps of (a) providing a plurality of light emitting diodes, the plurality of light emitting diodes including light emitting diodes of at least two different current ratings, (b) supplying from a power supply to the plurality of light emitting diodes a supply current about equal to a current rating of one or more light emitting diodes having the highest of the at least two different current ratings, and (c) driving the plurality of light emitting diodes by pulse width modulation, each light emitting diode being driven at a maximum duty cycle equal to about the current rating of the light emitting diode divided by the supplied current. Preferably, the current supplied in step (b) is about equal to an average current rating of the one or more light emitting diodes having the highest of the at least two different current ratings.

Preferably, the method further comprises the step of varying the intensity of light emitted from at least one of the groups of light emitting diodes by varying the duty cycle of the at least one group of light emitting diodes below the maximum duty cycle set in step (c).

In yet another aspect, our invention relates to a method of calibrating light output from a lighting device. The method comprises the steps of (a) providing a plurality of light emitting diodes, the plurality of light emitting diodes including light emitting diodes of at least two different current ratings, (b) supplying a current to the plurality of light emitting diodes, (c) setting a predetermined duty cycle at which each light emitting diode of the plurality of light emitting diodes is to be driven, (d) comparing an initial spectrum of light that is, or is set to be, emitted by the plurality of light emitting diodes when driven at the predetermined duty cycles set in step (c) with a predetermined control spectrum of light, and (e) adjusting the duty cycle at which at least one light emitting diode of the plurality of light emitting diodes is to be driven if the initial spectrum and the control spectrum differ by at least a predetermined amount when compared.

In yet another aspect, our invention relates to a lighting device comprising a plurality of light emitting diodes, the plurality of light emitting diodes including light emitting diodes of at least two different current ratings. A power supply is provided for supplying to the plurality of light emitting diodes a supply current about equal to a current rating of one or more light emitting diodes having the highest of the at least two different current ratings. A controller is provided for driving the plurality of light emitting diodes by pulse width modulation, each light emitting diode being driven at a maximum duty cycle equal to about the current rating of the light emitting diode divided by the supplied current.

A better understanding of these and other features and advantages of the invention may be had by reference to the drawings and to the accompanying description, in which preferred embodiments of the invention are illustrated and described.

BRIEF DESCRIPTION OF THE DRAWINGS

Throughout the figures, like or corresponding reference numerals have been used for like or corresponding parts.

DETAILED DESCRIPTION OF THE PREFERRED EMBODIMENTS

Figure 1:
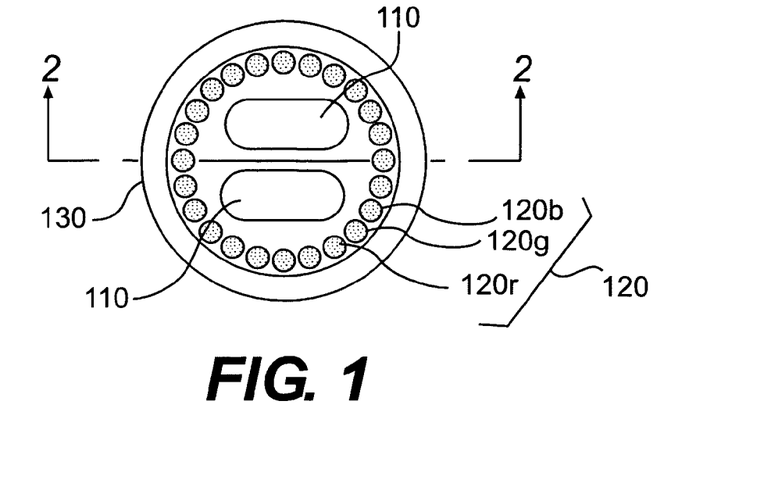
FIG. 1 is a schematic plan view of a lighting device according to an embodiment of our invention, with the housing removed for clarity.
Figure 2:
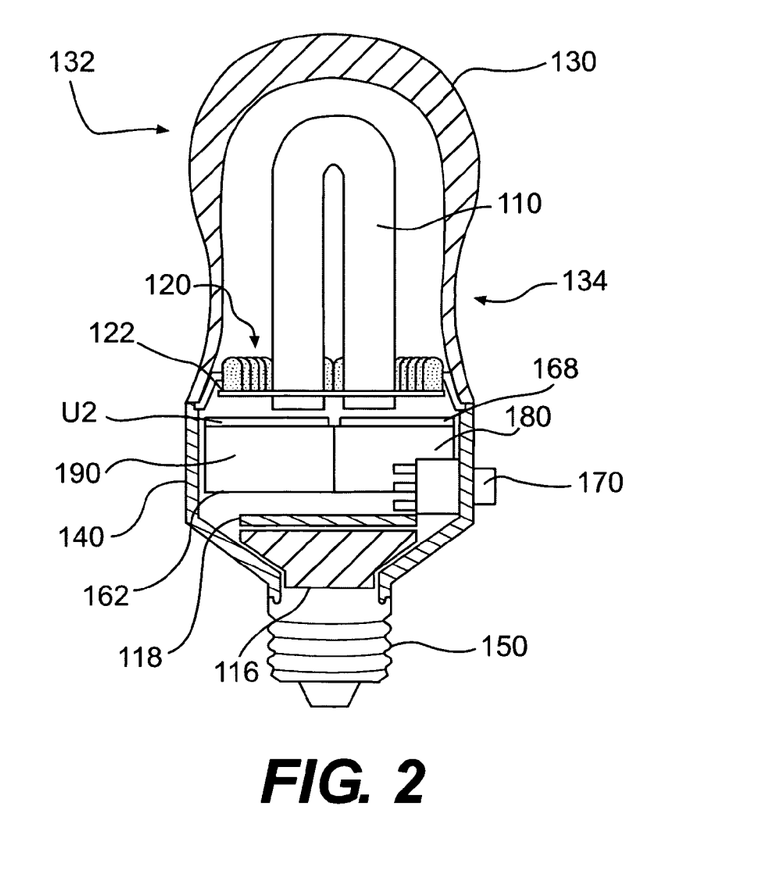
FIG. 2 is a schematic cross-sectional view the lighting device of FIG. 1, taken along line 2-2 in FIG. 1.

One preferred lighting device according to our invention is illustrated in FIGS. 1 and 2. In this embodiment, the lighting device 134 comprises an Edison-style light bulb 132 (i.e., a screw-in light bulb configured to mount in a conventional light socket). However, as discussed above, lighting devices according to our invention may take any desired shape and size, and need not be configured as a bulb for engagement with an incandescent light fixture. For example, lighting devices according to our invention also include bulbs for engagement with any standard light fixture (e.g., fluorescent, incandescent, halogen, etc.), as well as stand-alone devices configured to be plugged into a wall socket, and the like.

As shown in FIGS. 1 and 2, the bulb 132 includes a base 140 having a screw-in connector 150 adapted to mate with a conventional incandescent light socket in a lamp, light fixture, or the like. A plurality of LEDs 120 is mounted on the base 140. Preferably, one or more compact fluorescent light source 110 are mounted on the base 140 to provide a source of white light for illumination. A translucent housing 130 is preferably mounted on the base 140 and encloses the plurality of LEDs 120 and the fluorescent bulbs 110. The bulb 132 also preferably includes an active ingredient dispenser 116 mounted on the base 140. The active ingredient dispenser 116 preferably includes a cartridge 118 or other holder of active ingredient to be dispensed from the bulb.

Preferably, the LEDs 120 are arranged on an LED board 122 around at least a portion of the periphery of the base 140, so as to encircle the fluorescent bulbs 110. Preferably, the LEDs 120 include a number of different color LEDs, arranged such that any two adjacent LEDs are of different colors. With such a configuration, the different colored LEDs may be evenly spaced around the inside of housing 130 to provide a suitable light display when perceived from any side of bulb 132. One or more diffusers or light interfaces (not shown) may be provide on the housing 130 so as to diffuse or mix the light emitted from the plurality of LEDs 120 to achieve a uniform color of perceived light.

Alternatively, the housing 130 itself may serve as a diffuser. In the preferred embodiment shown in FIGS. 1 and 2, the plurality of LEDs 120 comprises twenty-four LEDs—eight red LEDs 120r, eight green LEDs 120g, and eight blue LEDs 120b—physically arranged in repeating red, green, blue order, around the perimeter of the base 140. Of course, any number, color combination, and/or arrangement of LEDs can be used.

In one embodiment, the LEDs 120 may be arranged in clusters, with different colored LEDs positioned close to each other (e.g., clusters of one red, one green, and one blue LED arranged in a triangle) to give increased control over the perception by a user of the colors to be emitted from housing 130. The clusters may also be adjacent to or covered by a light diffuser or light interface. Such an arrangement gives an observer the perception that the cluster is a single pixel. Alternatively, the LEDs 120 may be spaced apart or otherwise arranged such that colors emitted by individual LEDs are separately discernable.

The fluorescent light source 110 preferably comprises a pair of substantially U-shaped, compact fluorescent bulbs, as shown in FIG. 2. Preferably, each compact fluorescent bulb 110 has a first electrode at one end from which it extends up in a direction away from base 140, until it bends back on itself near the top of housing 130, so as to extend back toward base 140 to a second electrode at the other end. Of course, various other sizes, shapes, orientations, and arrangements of the fluorescent bulbs 110 are possible within the scope of our invention.

In one alternative, compact fluorescent bulbs 110 can be formed of a single bulb that has a plurality of separate lengths, each of which extends up from the base 140 and then bends back on itself to extend back to base 140, with the lengths being interconnected so as to have only two electrodes, each at opposite ends of the total length (e.g., M-shaped, double M-shaped, and the like). In another alternative, one or more spiral or helical shaped bulbs may be used.

Preferably, the total length of the multiple compact fluorescent bulbs 110 is in the range of about 2 to about 21 inches, whether the compact fluorescent bulbs are actually distinct bulbs, or a single bulb having a plurality of distinct lengths. Preferably, this could include about 1-inch lengths, with one bend, to about 3.5 inch lengths, with 1 to 3 bends. This provides a high surface area of light emission to provide ample light to illuminate a room or the like.

The active ingredient dispenser 116 is configured to dispense active ingredients, such as fragrances, air sanitizers, and insect control substances (e.g., an insecticide or insect attractant) in any of a variety of known manners. In one preferred embodiment, the active ingredient is disbursed in an oil or gel provided in a container, such as a cartridge 118. The container or cartridge 118 may be replaceably received in and/or secured to the bulb 132, to provide the desired emission of active ingredient. For exemplary purposes, we discuss our invention with respect to heat-assisted evaporation devices in which heat is applied to increase the evaporation rate of an oil, gel, or the like containing the active ingredient by a heater. Of course, other types of active ingredient dispensers can also be used, such as fan-assisted evaporation devices, piezo-electrically actuated atomization devices, and/or unassisted active ingredient dispensers. Unassisted active ingredient dispensers may simply include venting mechanisms that expose the active ingredient to the ambient environment, or other such designs that enhance/provide convective airflow across the active ingredient delivery medium. These active ingredient dispensers are known in the art, and will not be described in detail herein.

The LEDs 120, fluorescent bulbs 110, and LED board 122 are mounted on the base 140, directly or indirectly. Base 140 includes a control circuit board 162, which includes an LED driver 190 and a fluorescent ballast 180. By providing power (and control) for these features on one board, a more compact bulb 132 is achieved. Alternatively, separate boards may be provided for the LEDs 120 and compact fluorescent bulbs 110. Electrical power is supplied to board 162 through its electrical connection (not shown) to connector 150, which receives power when mated with a conventional light socket.

The control board 162 also preferably includes a processor U2 for controlling the plurality of LEDs 120. For example, control of the LEDs may involve controlling the LEDs 120, individually or as a group, to change the color or colors of light perceived by a user from outside of housing 130 (this may involve the use of a diffuser or the like). In addition, the processor U2 may control the brightness of the LEDs 120 by changing the current applied to them or by changing a duty cycle using pulse width modulation. Further, the processor U2 may control the LEDs to run one or more predetermined lighting presentations (e.g., light shows or themes) that vary the light color, brightness, activation, etc., over the course of the presentation to provide an entertaining lighting show. The controller U2 may also be configured to control the fluorescent bulbs 110, including their brightness or activation. Preferably, however, the fluorescent bulbs 110 are activated on their own, without the LEDs 120, to provide substantially white light for illuminating a room or other area. The LEDs may be used separately as nightlights or to provide ambience using color features or color shows that are pleasing to a user.

The light shows may be stored in a memory 168. The memory 168 may include software programs for controlling the board 162 and/or processor U2 to operate the predetermined presentations. The memory may be included on the control board 162, may comprise a removable memory card or cartridge, and/or may comprise onboard memory of the processor U2.

In an embodiment in which the memory 168 is configured as a removable memory card, the card preferably stores one or more predetermined programs for controlling the LEDs in one or more predetermined themes and/or light shows. The memory card 168 in this embodiment is preferably adapted to engage an expansion port of the processor U2. The expansion port preferably is configured to accept an aftermarket memory card, such as, for example, a card utilizing a 5-pin card edge connector (the pins corresponding to power, ground, transmit data, receive data, and control). Preferably, the card comprises a serial programmable read only memory chip and the associated electronics needed to complete the interface. This card preferably designed to be extremely low in cost, to enable the card to be inexpensive and/or disposable.

When no memory card is installed, the processor U2 may run one or more pre-programmed light shows or themes stored in onboard memory (or stored in a separate, non-removable external memory associated with processor U2). The user can replace the pre-programmed light shows or themes by inserting a memory card. When installed, the memory card will override the pre-programmed light shows or themes contained in the processor's onboard (or external) memory.

In another alternative, a portion of the program memory containing the light show data onboard the processor U2 and/or memory 168 may be reprogrammed with new light show data via a standard personal computer through a serial, USB, or other known interface. Such data may, for example, have been downloaded to the personal computer from a server via a network connection, or programmed on the personal computer.

A user interface 170 is provided on the base 140 to provide a user with control of the control board 162 and/or processor U2. The user interface 170 allows the user to select one or more of the perceived color, brightness, activation, etc. of the LEDs 120 and compact fluorescent bulbs 110. The user interface 170 may also allow the user to control the activation, emission intensity/rate, type of active ingredient dispensed, etc., of the active ingredient dispenser 116. Preferably, the user interface 170 comprises a three-switch interface (only one switch is visible in FIG. 2). The three-switch interface (switches S1, S2, and S3) and its operation will be described in more detail below, with respect to a preferred circuit usable with our invention. Alternatively, the user interface 170 may comprise a button, which a user can toggle to switch between different settings. In other embodiments, the user interface 170 may be more elaborate (and be provided at base 140, by remote control, etc.) so as to allow a user more sophisticated control of the operation of the bulb 132. For example, the interface could allow the user to design programs including color changes, changes in brightness of various components, changes in intensity/rate of emission of active ingredient, timed activations and/or deactivations, etc., and combinations thereof.

As described in more detail below, the LEDs 120 and fluorescent bulbs 110 are preferably controlled and powered by an integrated circuit, such as the one shown in FIGS. 3, 3A, and 3B. The active ingredient dispenser 116 is preferably powered and controlled by a separate circuit (not shown), whereby operation of the active ingredient dispenser 116 is independent of the LEDs and/or fluorescent bulbs 110. Alternatively, the active ingredient dispenser 116 could be connected to the same circuit as the LEDs 120 and the fluorescent bulbs 110, so as to provide control of the active ingredient dispenser 116 by the controller U2 (e.g., to control output of the active ingredient in coordination with a preprogrammed light show, in accordance with user input to the controller U2, or the like). Numerous ways of connecting the active ingredient dispenser to the circuit of the LEDs 120 (with or without control by the controller U2) would be apparent to one of ordinary skill in the art, and will not be described further herein.

An integrated circuit usable to control lighting devices according to our invention will now be described with respect to FIGS. 3, 3A, and 3B. As shown in FIG. 3, the circuit generally comprises a compact fluorescent ballast 180 that drives the fluorescent bulbs 110, an electronic LED driver 190 having a microprocessor U2 that drives and controls the LED array 120, and a switch S3 for switching between the fluorescent bulb 110 and the LED array 120. The user can select between the fluorescent light source 110 (for white light) and the LED array 120 (for colored light/ light shows) using power switch S3. One position of the switch S3 will connect the AC voltage source to the fluorescent ballast 180 and provide white light. The other position of the switch S3 will connect the AC voltage source to the LED driver 190 and provide colored light (including steady illumination, flashing, changing color, etc., for light shows, themes and the like, depending on the actuation of switches S1 and S2 by the user, as further discussed below). Preferably, the fluorescent ballast 180, LED driver 190, microprocessor U2, fluorescent light source 110, and LED array 120 are all assembled into an integrated module which is approximately the size of a standard 60 W incandescent light bulb. However, as discussed above, lighting devices according to our invention can be configured in any shape and size.

The switch S3 shown is a double pole single throw switch, which allows either the fluorescent ballast 180 or the LED driver 190 to be powered, but does not allow both to be powered simultaneously. Alternatively, however, we envision that in some instances it might be desirable to provide power to both the fluorescent ballast 180 and the LED driver 190 simultaneously, in which case, for example, a three-position switch could be used, the third position connecting both the fluorescent ballast 180 and LED driver 190 to the AC voltage source. In addition, other electronic components, such as an active ingredient dispenser, could be connected using additional positions of the same switch, or using one or more additional switches.

Figure 3:
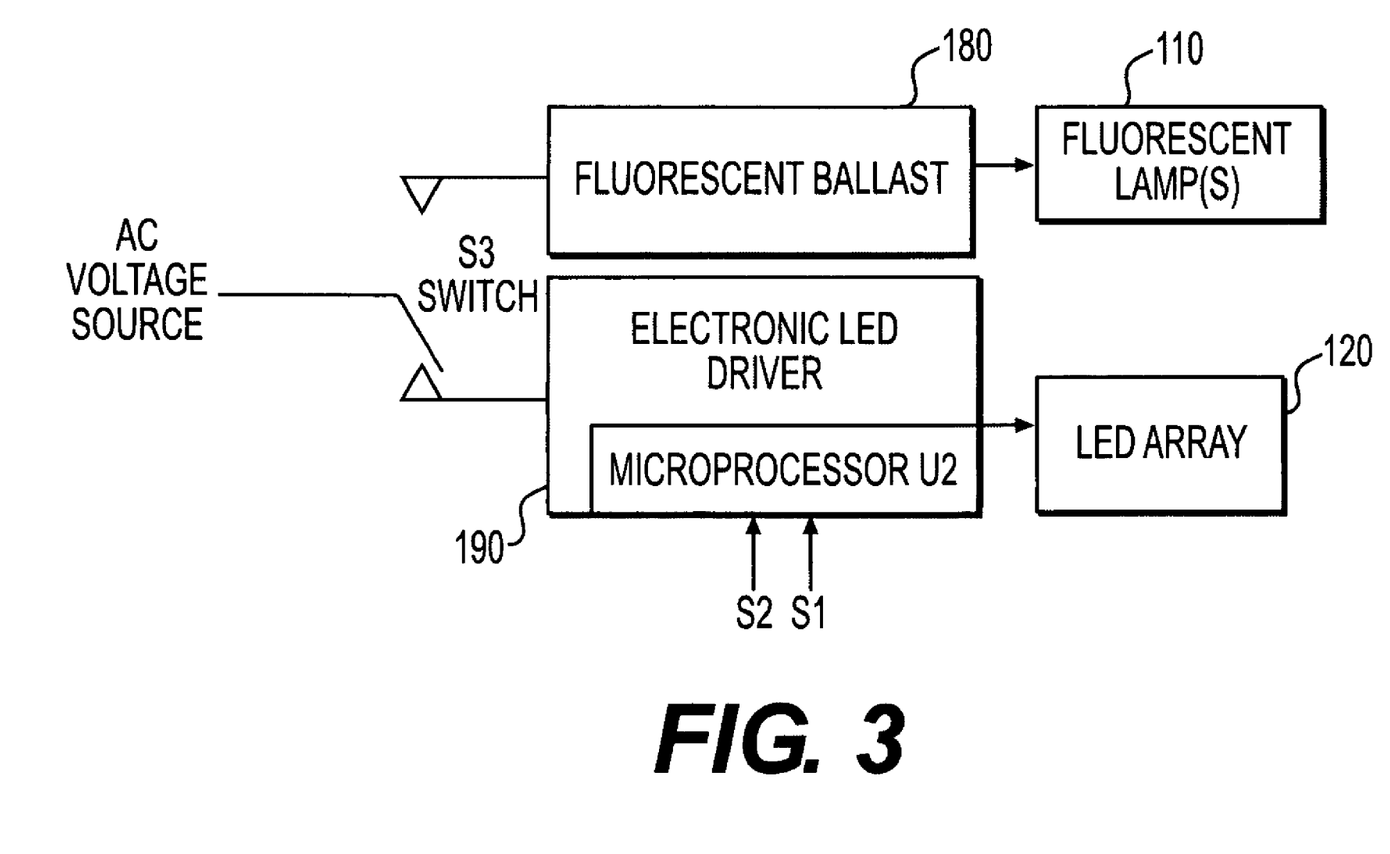
FIG. 3 is a schematic view of a circuit usable with the lighting device of FIG. 1.
Figure 3A:
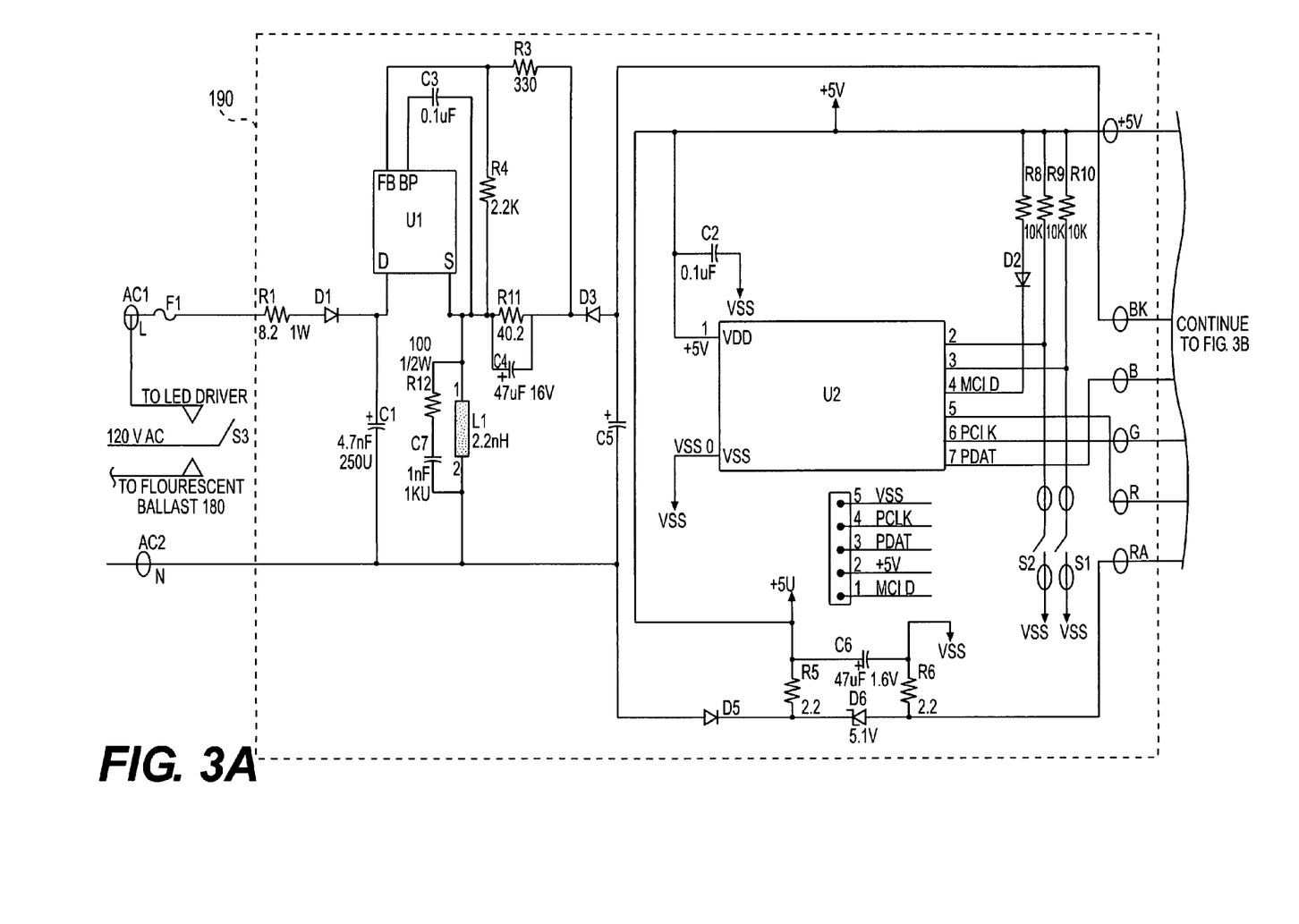
FIG. 3A is a circuit diagram showing the LED driver of the circuit shown in FIG. 3.
Figure 3B:
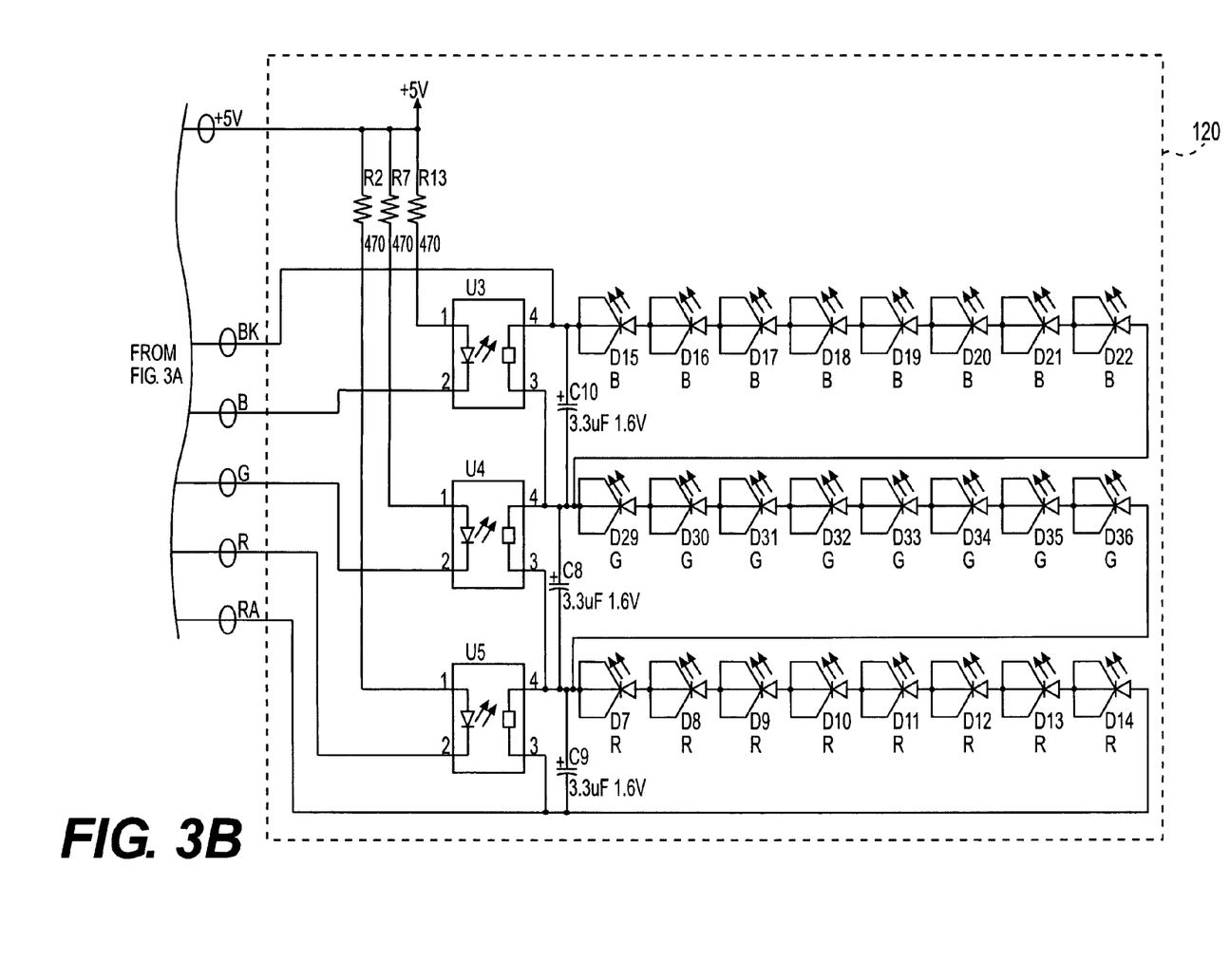
FIG. 3B is a circuit diagram showing the LED array of the circuit shown in FIG. 3.

In the exemplary embodiment shown in FIGS. 3, 3A, and 3B, the fluorescent light source 110 comprises a helical 15 W T3 tube. Of course, as discussed above, various other fluorescent light sources could instead be used. Any suitable conventional ballast may be used to power the fluorescent light source 110. However, in the circuit shown, the ballast 180 comprises a voltage-fed non-isolated series resonant oscillator, as is commonly used in compact fluorescent lamp applications.

The LED driver 190 is preferably a constant current mode buck-boost converter, which bucks (lowers) or boosts (increases) line voltage to match the required line voltage to power the LED array 120. The LED array 120 may include any number of LEDs of one or more colors. Preferably, however, the LED array 120 comprises a plurality of red, green, and blue LEDs. The number of LEDs of each color is preferably, but need not necessarily be, the same. Preferably, the plurality of LEDs is connected in series with the power supply. The LED array 120 illustrated in FIG. 3B comprises three groups of LEDs, a group of eight series-connected blue LEDs D15-D22, arranged in series with a group of eight series-connected green LEDs D-29-D36 and a group of eight series-connected red LEDs D7-D14. While the groups of LEDs in this embodiment are shown as all being of the same color, we envision that there may be instances in which it would be desirable that each group of LEDs be provided with LEDs of two or more colors.

Each group of series-connected LEDs has an optically isolated field effect transistor (opto-FET) U3-U5 connected in parallel therewith, for selectively shunting around the group of LEDs. Generally, an opto-FET is a specially designed field effect transistor (FET) that uses an internal LED in optical communication with a photodetector to provide the gate signal. Instead of directly driving the gate signal to turn on the opto-FET as in traditional FETs, an opto-FET is turned on by applying a current to the internal LED. The light emitted from the internal LED energizes the photodetector, which in turn closes the opto-FET. The internal LED is completely separate from (i.e., not electrically connected to) the photodetector and, therefore, provides electrical isolation between the gate of the opto-FET and load voltage. Thus, in the circuit shown in FIG. 3B, the microprocessor U2 is not at the same or similar voltage as the LED array 120, because the microprocessor U2 is electrically isolated from the LED array 120 by the opto-FETs U3-U5. The microprocessor U2 is powered by a 5-volt supply, which is floating with respect to the voltage of the LED array 120, and does not share a common reference or ground with the LED array 120. This makes it easier to use the circuit of our invention with an AC source of power.

In this manner, the groups of series-connected LEDs 120 can be connected in series to take advantage of the efficiency and other performance benefits of series connection, and at the same time each group can be individually controllable. In the embodiment shown in FIGS. 3A and 3B, the series arrangement of the LEDs 120 allows all of the LEDs to be activated by only three opto-FETs U3-U5. In addition, by using opto-FETs to activate the groups of LEDs, the microprocessor U2 can be electrically isolated from the high voltage supplied to the LEDs 120.

The series-connected arrangement of the LEDs is driven by a relatively high voltage, low current load, which can be more economically driven than a comparable high current, low voltage load. Connecting the LEDs in series as described above, creates a higher voltage drop than for a single LED, since the voltage drops of the series-connected LEDs are cumulative. This high cumulative voltage drop allows for a more efficient power supply, since the supply voltage is closer to the line voltage. However, this relatively high voltage is much greater than that required by most conventional, low cost controllers, microprocessors, etc., which typically require between about 3.3 and about 16 volts DC, the most common requiring between about 3.3 and about 5 volts. Preferably, the microprocessor U2 runs on 5 volts; however, controllers running off of different voltages may also be used with minor modifications to the circuit. By using the opto-FETs U3-U5, a relatively low voltage, low cost device can be used as the microprocessor U2, since it is electrically isolated from the higher voltage applied to the LEDs 120. That is, the opto-FETs isolate the low voltage portions of the circuit (i.e., the microprocessor U2 and the gates of the opto-FETs U3-U5, which are supplied with approximately 5-volts) from the high voltage portions of the circuit (i.e., the LED array, which in the embodiment shown, is supplied with approximately 78 volts).

Instead of the opto-FET arrangement shown in FIGS. 3A and 3B and described above, it would also be possible to use a high voltage driver, which has been designed to operate at higher voltages. However, these so called high side drivers are more expensive than low voltage devices because they require more silicon to implement and because their manufacturing process is more costly.

The microprocessor U2 accepts user inputs from switches S1 and S2, and provides a control signal to control the opto-FETs U3-U5, which in turn control the LED array 120. For example, the microprocessor can preferably activate various pre-programmed light shows stored in memory (onboard, external, and/or removable memory) to change the activation and/or intensity of the LEDs in the LED array, or to hold a particular color that is currently being generated by the LEDs.

One preferred LED driver 190 usable with the circuit will now be described in more detail, with reference to FIG. 3A. When S3 is switched to the LED driver 190, current flows through a diode D1 and capacitor C1 that form a half-wave rectifier to provide a DC voltage across C1. A resistor R1 provides a small amount of input impedance to reduce inrush current to C1, to reduce electromagnetic interference (EMI), and to increase the ability of the entire circuit to withstand voltage and current surges. The DC voltage across C1 drives a switching power supply that is operated in constant current power mode, comprising an integrated power metal oxide field effect transistor (MOSFET) and control module U1, an inductor L1, a diode D3, and a capacitor C5.

Control module U1 preferably comprises a high frequency switching buck-boost converter, such as part number LNK 306, manufactured by Power Integrations, Inc., headquartered in San Jose, California. Control module U1 has 4 pins: FB=feedback, BP=bypass, D=drain, and S=source. The control module U1, inductor L1, diode D3, and capacitor C5 are configured in a buck-boost topology, to lower the line voltage to that needed to drive the LEDs (e.g., about 2.2 volts for each red, and about 3.8 volts for each blue or green LED, for a total of about 78 volts for the eight red, eight green, and eight blue LEDs shown in FIG. 3B). A current sense resistor R11 provides a sample of the load current back to the control module U1, to set the current provided by the power supply in constant current mode. The internal MOSFET of control module U1 conducts (is on) when the BP pin voltage exceeds 4.85V and the input current delivered to the FB pin is less than 49 uA. If a current in excess of 49 uA is applied to the FB pin, the internal MOSFET does not conduct (is held off). When the internal MOSFET of control module U1 is on, current is delivered to the load LEDs D1-D17 via inductor L1, diode D5, zener diode D6, and freewheeling diode D3. When the internal MOSFET of control module U1 is off, stored energy in inductor L1 delivers power to the load via diode D5, zener diode D6, and freewheeling diode D3.

Resistors R11, R3, and R4 and capacitor C4 provide a feedback network to control the switching of the internal MOSFET of control module U1. Capacitor C4, which is in parallel with current sense resistor R11, averages the pulsing voltage across current sense resistor R11. The current sense resistor R11 is sized such that when the voltage across it reaches 2V, the divider network created by resistors R3 and R4 applies a current greater than 49 uA to the FB pin of the control module U1, thereby turning the internal MOSFET of the control module U1 off. When the voltage across resistor R3 is less than 2V, the current delivered to the FB pin is less than 49 uA and the internal MOSFET of control module U1 is allowed to turn on. In this way, load current to LEDs D1-D17 is controlled, and its average value is set by the equation I=2/R11 (hence a 40 ohm resistor results in a load current of 2V/40 ohms=50 mA).

The internal circuitry of the control module U1 is powered by a capacitor C3 when the internal MOSFET is on. When the internal MOSFET is off, C3 is charged to 5.8 Volts. The capacitor C3 provides a small current from the internal MOSFET source voltage at the BP pin to activate control module U1's internal 5.8 volt supply. This allows the control module U1 to run continuously.

A zener diode D6, in series with the load, provides 5 volts via resistors R5 and R6 to capacitor C6. This 5-volt supply voltage is used to power microprocessor U2 at pin 1.

Microprocessor U2 is programmed such that, when powered, it outputs three pulse width modulation (PWM) signals at pins 5, 6, and 7, respectively. The PWM signals are coupled directly to input diode cathodes of the opto-FETs U3-U5. The input diode anodes of opto-FETs U3-U5 are connected to 5 volt supply across capacitor C6 via pull up resistors R2, R7, and R13. When pins 5, 6, and/or 7 of the microprocessor U2 provide a logical high (5V) signal to the input diode cathode of one or more of opto-FETs U3, U4, and U5, respectively, the input diode is reverse biased and the respective opto-FET(s) are open (off). When pins 5, 6, and/or 7 of the microprocessor U2 provide a logical low (0V) signal to the input diode cathode of one or more of opto-FETs U3, U4, or U5, respectively, the input diode is forward biased and the respective opto-FET(s) are turned closed (on). When opto-FETs U3, U4, and U5 are off (open), current flows normally from the buck-boost converter through the LED load. When the opto-FETs U3, U4, and U5 are on (closed) current is diverted away from the LEDs and flows through the opto-FET (i.e., current is shunted around the LEDs associated with each closed opto-FET). Since there is independent control of each opto-FET U3-U5, current can be diverted away from each individual group of LEDs. Opto-FET U5 provides a current bypass for the red LEDs D7-D14, Opto-FET U4 provides a current bypass for the green LEDs D29-D36, and opto-FET U3 provides a current bypass for the blue LEDs D-15-D22. In this way, the microprocessor U2 can use PWM to control the LED current in each group of LEDs individually.

The average current applied to each group of LEDs can also be adjusted by changing the duty cycle of the PWM signal applied to that group through the opening and closing of the opto-FETs. Thus, by adjusting the duty cycle applied to each opto-FET U3-U5, the average current applied to each group of LEDs per cycle can be adjusted, and hence the brightness/intensity of each group can be adjusted. Controlling the relative intensities of the red, green, and blue LEDs in proximity on a printed circuit board using PWM current control allows for the generation of over 256 different perceived colors. Preferably, the PWM signal is at a frequency high enough that there is no noticeable flicker, and so that the human eye perceives only a blended color based upon the proportion of red, green, and blue light emitted from the LED groups. Alternatively, however, we envision situations in which it may be desirable to set the frequency lower, so that a perceptible flicker or flash of the LEDs is observable.

A capacitor C5 connected between the output of the switching power supply and the power return helps to stabilize the switching power supply by providing load current smoothing, such that the current supplied to the LEDs is approximately DC with a small amount of AC ripple. Capacitor C5 provides a modest amount of filtering for the power supply (preferably, about 1 microfarad). Larger capacitors may also be used here, however, they tend to produce surge currents in the LEDs, which cause flashes of light. Using a larger capacitor in the circuit of FIGS. 3A and 3B may also exceed the peak current ratings of the LEDs. A resistor R12 and a capacitor C7 provide a snubber network to limit voltage excursions and oscillation when the internal MOSFET of control module U1 turns off.

Even using a relatively small capacitor for capacitor C5, some flashes of light were still perceptible when the capacitor C5 discharged. Accordingly, additional capacitance is preferably distributed among capacitors C10, C8, and C9, which are arranged in parallel with opto-FETs U3, U4, and U5, respectively. This distributed capacitance arrangement suppresses the LED pulse currents delivered by capacitor C5 when any of the opto-FETs close. The three capacitors C10, C8, and C9 are effectively in series such that the reciprocal capacitances of the capacitors are cumulative (preferably about 3.3 microfarads each, for a cumulative equivalent of 1.1 microfarads). However, because each of the capacitors C10, C8, and C9 is in parallel with the respective group of LEDs, the capacitor no longer provides a source of surge current to the respective LED string. This is because the capacitor is always at the potential of the LED string. In this manner, a high value of capacitance can be obtained for stabilizing the switching power supply, while avoiding the surge current and the associated light flashes that occur when a large capacitance is connected in series with the groups of LEDs.

As discussed above, the user interface also includes a pair of switches S1 and S2, for controlling operation of the LED array 120. Switch S1 is a mode select switch which, when closed, provides a logic level low (0V) value to input pin 3 of the microprocessor U2. This input commands the microprocessor U2 to switch the color light show that is currently being displayed by the LED array 120. For example, when the mode select switch S1 is actuated by a user, the microprocessor U2 preferably accesses the next of a plurality of pre-programmed light shows or themes stored in a memory, such as the previously discussed removable memory card, an internal memory of the microprocessor U2, an external memory, or the like. Switch S2 is a hold switch which, when closed, provides a logic level low (0V) signal to input pin 2 of the microprocessor U2. This input commands the microprocessor U2 to hold the particular color blend currently being produced by the LED array 120. When the mode switch S1 and hold switch S2 are not being activated by a user, resistors R8, R9, and R10 pull pins 2, 3, and 4 of the microprocessor U2 to a logic level high signal (5V) via the 5V supply voltage across capacitor C6.

A method that we have found to be useful for controlling a lighting device of our invention having a series-connect LED array (but which is also applicable to lighting devices having LEDs arranged in other configurations), is described below with reference to FIG. 4.

Different colored LEDs typically have different current ratings (e.g., average or continuous current rating, peak or maximum current rating, etc.). For example, red LEDs typically have an average or continuous current rating of about 50 milliamps, while green and blue LEDs typically have an average or continuous current rating of about 30 milliamps. In order to realize the full potential (i.e., full intensity) of a given LED, it is preferable to drive the LED at or close to its average or continuous current rating. However, when the LEDs are connected in series and are driven by a constant current source, as in the embodiment of FIGS. 3, 3A, and 3B, if the load current is set at the average or continuous current rating of the LED(s) having the highest current rating among the plurality of LEDs, the LEDs having lower average or continuous current ratings will be driven in excess of their rated current, which may lead to their premature failure, overheating, or other problems. Conversely, if the load current is set to be the average or continuous current rating of the LED(s) having a current rating lower than the highest current rating among the plurality of LEDs, the LEDs having the current ratings above the load current will not be driven to their full potential.

Figure 4:
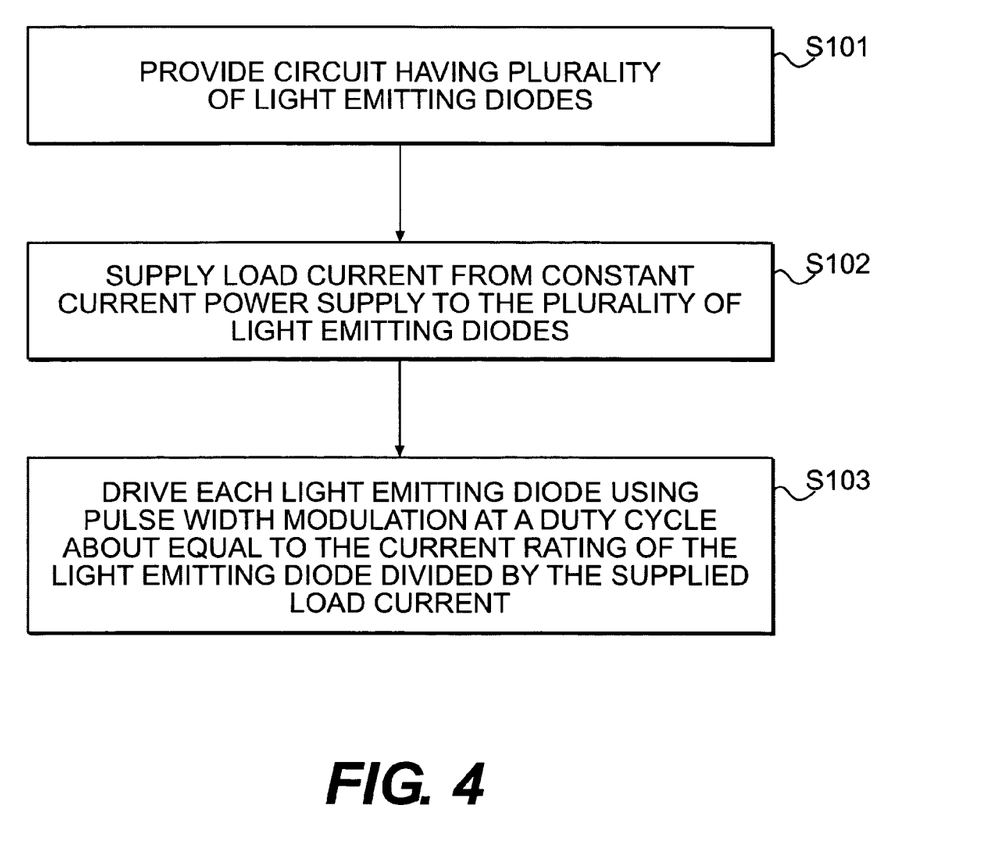
FIG. 4 is a flowchart showing a method of controlling a lighting device according to one embodiment of our invention.

In view of the foregoing, we developed the method of controlling and driving LEDs of a lighting device shown in the flowchart of FIG. 4 to allow LEDs to be driven to their full potential. This method is applicable to lighting devices having a plurality of LEDs arranged in series, such as those described in the foregoing embodiments, as well as lighting devices having LEDs arranged in other configurations. In step S101, we provide a circuit having a plurality of light emitting diodes, which includes light emitting diodes of at least two different current ratings. Preferably, the plurality of light emitting diodes comprises a first group consisting of light emitting diodes of a first color, and a second group consisting of light emitting diodes of a second color In step S102, a current is supplied from a power supply to the plurality of LEDs. Preferably, the power supply is a constant current power supply, which supplies a load current about equal to an average or continuous current rating of LEDs having the highest of the at least two different current ratings of the plurality of LEDs. For example, if the average or continuous current rating for red LEDs is 50 milliamps, and for green and blue LEDs is 30 milliamps, the supplied load current will be set to about 50 milliamps.

In step S103, the plurality of LEDs is driven by PWM. Preferably, each LED of the plurality of LEDs is driven at a maximum duty cycle equal to about the current rating of the LED divided by the supplied load current. Thus, if the supplied load current is set to 50 milliamps, a red LED having a current rating of 50 milliamps would be driven by PWM at a maximum duty cycle of about 100% (current rating of 50 milliamps/supplied load current of 50 milliamps), while blue and green LEDs having current ratings of 30 milliamps would be driven by PWM at a maximum duty cycle of about 60% (current rating of 30 milliamps/supplied load current of 50 milliamps). Of course, this method is applicable to LEDs having any current rating, and the duty cycles would be adjusted accordingly based on the above relation (current rating/supplied load current). Thus, in a given duty cycle, an LED will be provided with an average current of at most the average current rating of that LED. In addition, we envision that the method could be applied using current ratings other than the continuous or average current rating, such as peak current rating, or the like.

In this manner, all of the plurality of LEDs can be driven at a maximum duty cycle, such that the average current over the cycle is at or near their respective current ratings, so as to realize their full potential, without exceeding the current rating of any of the plurality of LEDs.

In addition, once the maximum duty cycle is established in step S103, the duty cycles at which the various LEDs can be further adjusted using conventional PWM techniques to vary the intensity of the LEDs to change the color of light emitted from the lighting device ("intensity duty cycle"). The maximum duty cycle for each type and/or color of LED is determined in steps S1 0 1-S103. The resultant PWM duty cycle (i.e., the duty cycle at which each LED is actually driven at any given time) is a composite signal, based on the maximum duty cycle and the intensity duty cycle. The resultant PWM duty cycle is preferably calculated by software stored in the microprocessor U2 based on the maximum duty cycle and the intensity duty cycle. Preferably, the resultant PWM duty cycle is about equal to the product of the maximum duty cycle multiplied by the intensity duty cycle. In such a case, if the maximum duty cycle is 100% and the intensity duty cycle is 50%, the PWM duty cycle would be about 50%. Similarly, if the maximum duty cycle is 60% and the intensity duty cycle is 50%, the PWM duty cycle would be about 30%. In this manner, a single PWM signal can be used to drive and adjust the LEDs at or below their respective maximum duty cycles.

Alternatively, the resultant PWM duty cycle may be based on a weighted product of the maximum duty cycle and the intensity duty cycle, or some other mathematical relation. In another alterative, instead of the resultant PWM duty cycle being determined by software, the resultant PWM duty cycle could be implemented by hardware.

Another method of our invention relates to a method of calibrating light output from a lighting device having a series-connected LED array (but which is also applicable to lighting devices having LEDs arranged in other configurations) to achieve a specific proportion of light from different groups of LEDs. The method is described below with reference to FIG. 5. The calibration method may be carried out by itself or in conjunction with the control method of FIG. 4 and/or the conventional intensity duty cycle control. When performed in connection with the method of FIG. 4, the first two steps of each method will be the same and need only be performed once.

Figure 5:
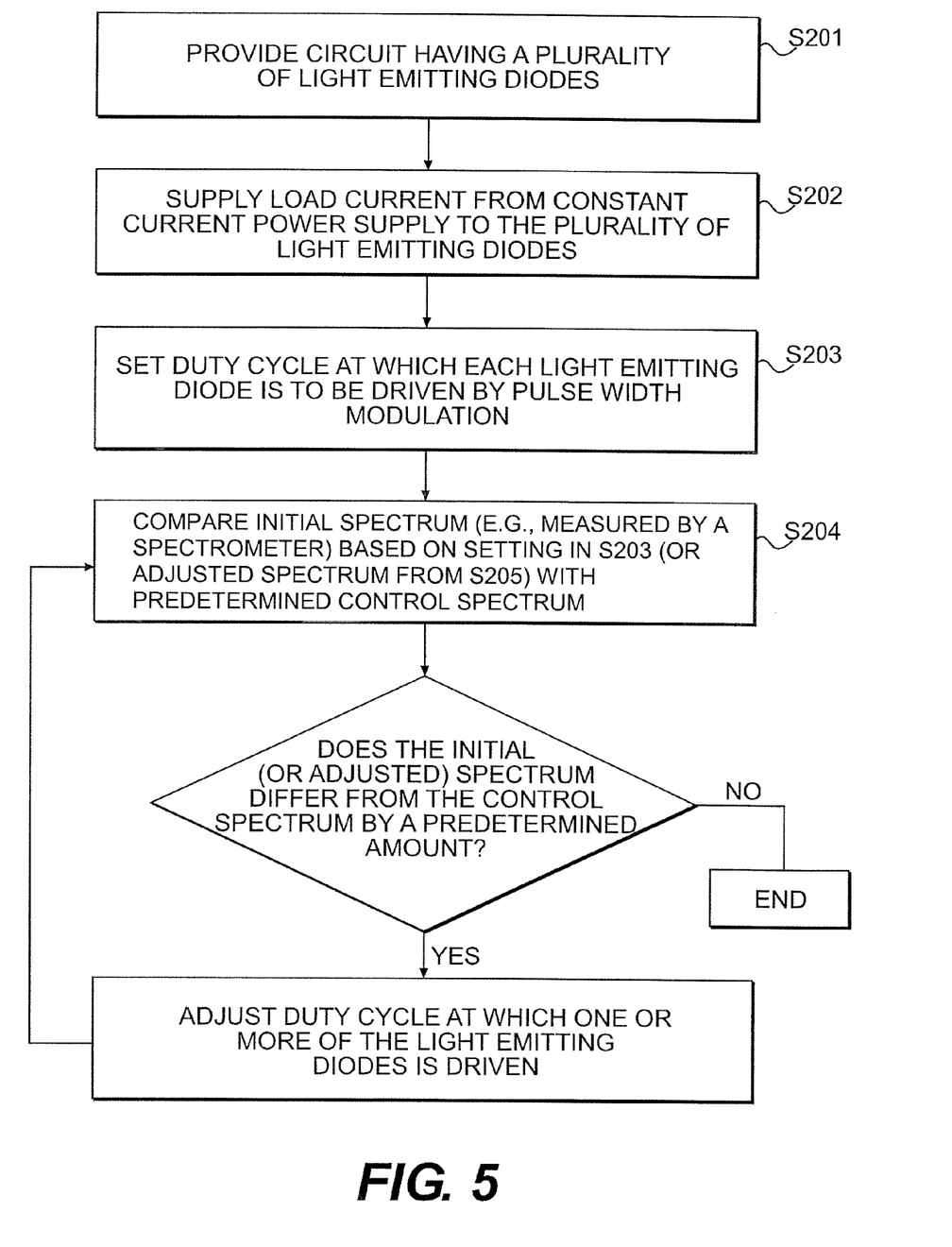
FIG. 5 is a flowchart showing a method of calibrating light output from a lighting device according to another embodiment of our invention.

In step S201 of the calibrating method, a plurality of LEDs is provided. The plurality of light emitting diodes preferably includes LEDs of at least two different current ratings. Then, in step S202, a current is supplied to the plurality of LEDs from a power supply. Preferably, the power supply is a constant current power supply. Next, in step S203, a predetermined duty cycle is set at which each LED of the plurality of LEDs is to be driven. This setting can be made manually or automatically, and can be set as a maximum duty cycle, in accordance with the method of controlling a lighting device shown and described with respect to FIG. 4. Alternatively, the setting can be made based on other criteria, such as manufacturers specifications for the LEDs, and the like.

In step S204, an initial spectrum of light that is, or is set to be, emitted by the plurality of light emitting diodes when driven at the predetermined duty cycles set in step S203 is compared with a predetermined control spectrum of light. The initial spectrum of light may be calculated based on design specifications of the plurality of LEDs, and this calculated initial spectrum can then be compared with the control spectrum. Alternatively, the initial spectrum emitted by the plurality of LEDs can be determined by actually perceiving the light emitted from the plurality of LEDs, and this perceived initial spectrum can be compared-with the control spectrum. In another alternative, the initial spectrum emitted by the plurality of LEDs can be detected by an instrument, and this detected initial spectrum can be compared with the control spectrum. As discussed above, the comparison can be made by a human and/or a computer, and may be manual or automatic. The control spectrum corresponds to a desired spectrum of illumination and can be determined based on numerous design considerations, a few examples being aesthetic appearance, color matching (e.g., of an object, another lighting device, other illumination, etc.), points on the CIE XYZ color space (CIE) chart, consumer preference, and the like.

If the initial spectrum and the control spectrum differ by a predetermined amount when compared in step S204, the duty cycle at which one or more of the LEDs is driven is adjusted in step S205 by increasing or decreasing the duty cycle(s), so as to more closely match the control spectrum. Again this step may be carried out by a human and/or by a computer and may be done manually or automatically. The predetermined amount of difference can by set at any desired difference. For example, the difference can be set as a distance between points on the CIE chart, the difference being measured as the distance on the CIE chart between the point representing the initial spectrum and the point representing the control spectrum. Alternatively, the predetermined difference may be defined as any perceptible difference, and can be measured by observation by one or more people.

After an adjustment has been carried out in step S205, the process can return to step of S204. Thus, once an adjustment has been made, the adjusted illumination spectrum can be compared with the control spectrum. If a difference between the adjusted spectrum and the control spectrum still exceeds the predetermined difference, a subsequent adjustment can be made, otherwise the method is completed. This loop may be repeated until a difference between the initial (or adjusted) spectrum and the control spectrum no longer exceeds the predetermined difference, or for a set number of repetitions.

In addition to the foregoing methods of controlling and calibrating lighting devices, the LEDs may additionally be controlled using the same or a different PWM signal to control the LEDs to adjust the activation and/or intensity of the various LEDs over time to perform the previously described light shows and/or light themes. For example, if a maximum duty cycle is set at, e.g., 60%, in accordance with the method shown described with respect to FIG. 4, the LEDs driven at this duty cycle will be on for a maximum of 60% of a given cycle. Thus, if the intensity of the LEDs is to be adjusted using PWM, the duty cycle can be adjusted to any duty cycle between zero and 60%. Such color change control of the LEDs is well known in the art and will therefore not be described in detail herein.

Our invention also is directed to lighting devices capable of implementing any or all of the foregoing methods, the lighting devices described herein being only a few of the lighting devices that might use the methods described herein.

Any method that is described above as capable of being carried out on a computer (i.e., a personal computer, microcontroller, processor, etc.) can be programmed as code for performing the steps of the method and stored in computer readable format on media, such as random access memory, read only memory, a hard drive, a floppy disk, a CD-ROM, and the like. The code for implementing such methods would be readily apparent to one of ordinary skill in the art, in view of the foregoing description of the methods. When stored on such media, the code may be executed by one or more computers, with or without the aid of additional software such as an operating system, so as to perform the methods described herein.

The embodiments discussed above are representative of preferred embodiments of our invention and are provided for illustrative purposes only. Although specific structures, dimensions, components, etc., have been shown and described, such are not limiting. The various features and elements of the embodiments can be interchanged, rearranged, omitted, and/or combined in various different combinations to achieve a desired result.

For example, while one preferred lighting device of our invention is described herein as having a source of white light for illumination, an active ingredient dispenser, a removable memory card, and the like, our invention also applies to embodiments in which one or more of these features is omitted, or in which these features are combined in different arrangements, or in which additional electronic components are provided with the lighting device.

Moreover, the LED array, fluorescent light source, active ingredient dispenser, memory medium, and any other electrical components provided with the lighting device may each be powered and/or controlled by a separate circuit. Alternatively, a single circuit may power any combination of two or more of the LED array, fluorescent light source, active ingredient dispenser, memory medium, and any other electrical component that may be provided with the lighting device.

These and other modifications and variations are contemplated within the scope of our invention.

INDUSTRIAL APPLICABILITY

Our invention provides a lighting device having a circuit including a plurality of light emitting diodes. The circuit is more efficient than conventional circuits for powering and controlling a plurality of light emitting diodes. Our invention also provides methods of controlling and calibrating lighting devices having a plurality of light emitting diodes using pulse width modulation.

We claim:

1. A lighting device comprising a circuit, the circuit comprising:
    a power supply that provides a supply voltage;
    a plurality of light emitting diodes connected in series with said power supply and powered by the supply voltage, said plurality of light emitting diodes including at least two groups of series-connected light emitting diodes, said groups of series-connected light emitting diodes being connected in series;
    a plurality of optically isolated field effect transistors, a different optically isolated field effect transistor being connected in parallel with each group of series-connected light emitting diodes, for selectively shunting around the group of series-connected light emitting diodes to which the optically isolated field effect transistor is connected in parallel; and
    a controller connected to a gate of each of said optically isolated field effect transistors for selectively turning said optically isolated field effect transistors on and off, whereby said controller is electrically isolated from the supply voltage by said optically isolated field effect transistors.

2. A lighting device according to claim 1, further comprising a plurality of capacitors, a different capacitor being connected in parallel with each optically isolated field effect transistor and the group of series-connected light emitting diodes associated therewith, and said plurality of capacitors being in series with said power supply, such that the capacitances of said plurality of capacitors are cumulative and serve to smooth a wave form of the supply current supplied by said power supply, while each capacitor is at substantially the same potential as said plurality of light emitting diodes.

3. A lighting device according to claim 1, further comprising a removable memory medium in communication with said controller, said memory medium storing data of at least one program, said controller controlling said plurality of optically isolated field effect transistors to control said light emitting diodes in accordance with the data stored on said memory medium.

4. A lighting device according to claim 1, said plurality of light emitting diodes comprising light emitting diodes of at least two different colors.

5. A lighting device according to claim 4, said at least two groups of light emitting diodes comprising a first group consisting of light emitting diodes of a first color and a second group consisting of light emitting diodes of a second color different than the first color.

6. A lighting device according to claim 1, wherein said lighting device comprises a light bulb, including a translucent housing and a base configured to mate with a light socket for providing power to said circuit, said translucent housing and said circuit being mounted on said base.

7. A lighting device according to claim 6, further comprising a fluorescent light source connected to said circuit.

8. A lighting device comprising a circuit, the circuit comprising:
    a power supply that provides a supply voltage;
    a plurality of light emitting diodes connected in series with said power supply and powered by the supply voltage, said plurality of light emitting diodes including at least two groups of series-connected light emitting diodes, said groups of series-connected light emitting diodes being connected in series;

a plurality of capacitors, a different capacitor being connected in parallel with each group of series-connected light emitting diodes, said plurality of capacitors being connected in series with said power supply, such that the capacitances of said plurality of capacitors are cumulative and serve to smooth a wave form of the supply current supplied by said power supply, while each capacitor is at substantially the same potential as said plurality of light emitting diodes;

a plurality of field effect transistors, a different field effect transistor being connected in parallel with each group of series-connected light emitting diodes, for selectively shunting around the group of series-connected light emitting diodes to which the field effect transistor is connected in parallel;

a controller connected to a gate of each of said field effect transistors for selectively turning said field effect transistors on and off; and a removable memory medium in communication with said controller, said memory medium storing data of at least one program, said controller controlling said plurality of optically isolated field effect transistors to control said light emitting diodes in accordance with the data stored on said memory medium.

9. A lighting device according to claim 8, said power supply comprising a switching power supply or a high/low driver.

10. A lighting device according to claim 8, said plurality of light emitting diodes comprising light emitting diodes of at least two different colors.

11. A lighting device according to claim 10, said at least two groups of light emitting diodes comprising a first group consisting of light emitting diodes of a first color and a second group consisting of light emitting diodes of a second color different than the first color.

12. A lighting device comprising a circuit, the circuit comprising:

a power supply that provides a supply voltage;

a plurality of light emitting diodes connected in series with said power supply and powered by the supply voltage, said plurality of light emitting diodes including at least two groups of series-connected light emitting diodes, said groups of series-connected light emitting diodes being connected in series;

a plurality of capacitors, a different capacitor being connected in parallel with each group of series-connected light emitting diodes, said plurality of capacitors being connected in series with said power supply, such that the capacitances of said plurality of capacitors are cumulative and serve to smooth a wave form of the supply current supplied by said power supply, while each capacitor is at substantially the same potential as said plurality of light emitting diodes, wherein said lighting device comprises a light bulb, including a translucent housing and a base configured to mate with a light socket for providing power to said circuit, said translucent housing and said circuit being mounted on said base.

13. A lighting device according to claim 12, further comprising a fluorescent light source connected to said circuit.

14. A method of controlling a lighting device, the method comprising the steps of:

(a) providing a plurality of light emitting diodes, the plurality of light emitting diodes including light emitting diodes of at least two different current ratings;

(b) supplying from a power supply to the plurality of light emitting diodes a current about equal to a current rating of one or more light emitting diodes having the highest of the at least two different current ratings; and (c) driving the plurality of light emitting diodes by pulse width modulation, each light emitting diode being driven at a maximum duty cycle equal to about the current rating of the light emitting diode divided by the supplied current.

15. A method according to claim 14, wherein the current supplied in step (b) is about equal to an average current rating of the one or more light emitting diodes having the highest of the at least two different current ratings.

16. A method according to claim 14, wherein the plurality of light emitting diodes is connected in series with the power supply.

17. A method according to claim 14, wherein the plurality of light emitting diodes comprises a first group consisting of light emitting diodes of a first color, and a second group consisting of light emitting diodes of a second color.

18. A method according to claim 17, further comprising the step of varying the intensity of light emitted from at least one of the groups of light emitting diodes by varying the duty cycle of the at least one group of light emitting diodes below the maximum duty cycle set in step (c).

19. A method of calibrating light output from a lighting device, the method comprising the steps of:

(a) providing a plurality of light emitting diodes, the plurality of light emitting diodes including light emitting diodes of at least two different colors;

(b) supplying a current to the plurality of light emitting diodes;

(c) setting a predetermined duty cycle at which each light emitting diode of the plurality of light emitting diodes is to be driven in order to attempt to match a predetermined control spectrum;

(d) analyzing an initial spectrum of light emitted by the plurality of light emitting diodes when driven at the predetermined duty cycles set in step (c) to determine if the initial spectrum matches the predetermined control spectrum of light; and (e) adjusting the duty cycle at which at least one light emitting diode of the plurality of light emitting diodes is to be driven if the initial spectrum and the control spectrum differ by at least a predetermined amount.

20. A method according to claim 19, wherein in step (d), the initial spectrum that is set to be generated by the plurality of light emitting diodes is calculated based on design specifications of the plurality of light emitting diodes, and the calculated initial spectrum is analyzed to determine if the calculated initial spectrum matches the predetermined control spectrum of light.

21. A method according to claim 19, wherein in step (d), the initial spectrum emitted by the plurality of light emitting diodes is perceived, and the perceived initial spectrum is analyzed to determine if the perceived initial spectrum matches the predetermined control spectrum of light.

22. A method according to claim 19, wherein in step (d), the initial spectrum emitted by the plurality of light emitting diodes is analyzed by an instrument, and the detected initial spectrum is analyzed to determine if the detected initial spectrum matches the predetermined control spectrum of light.

23. A method according to claim 22, wherein the instrument used to analyze the initial spectrum is a spectrometer.

24. A method according to claim 22, wherein the predetermined control spectrum is determined by one of aesthetic appearance, color matching, points on the CIE XYZ color space (CIE) chart, and consumer preference.

25. A lighting device comprising:
a plurality of light emitting diodes, the plurality of light emitting diodes including light emitting diodes of at least two different current ratings;
a power supply for supplying to the plurality of light emitting diodes a supply current about equal to a current rating of one or more light emitting diodes having the highest of the at least two different current ratings; and
a controller for driving the plurality of light emitting diodes by pulse width modulation, each light emitting diode being driven at a maximum duty cycle equal to about the current rating of the light emitting diode divided by the supplied current.

* * * * *